US011012495B1

(12) United States Patent
Vakalapudi et al.

(10) Patent No.: US 11,012,495 B1
(45) Date of Patent: May 18, 2021

(54) REMOTE SERVICE CREDENTIALS FOR ESTABLISHING REMOTE SESSIONS WITH MANAGED DEVICES

(71) Applicant: EMC IP Holding Company LLC, Hopkinton, MA (US)

(72) Inventors: Ramakrishna Vakalapudi, Northborough, MA (US); Adel Hanna, North Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 531 days.

(21) Appl. No.: 15/865,555

(22) Filed: Jan. 9, 2018

(51) Int. Cl.
*H04L 9/32* (2006.01)
*H04L 29/06* (2006.01)
*H04L 29/08* (2006.01)
*H04L 9/08* (2006.01)
*H04W 12/06* (2021.01)
*G06F 9/455* (2018.01)

(52) U.S. Cl.
CPC ........ *H04L 67/025* (2013.01); *G06F 9/45533* (2013.01); *H04L 9/321* (2013.01); *H04L 63/0838* (2013.01)

(58) Field of Classification Search
None
See application file for complete search history.

(56) References Cited

U.S. PATENT DOCUMENTS

| 7,966,418 | B2 | 6/2011 | Shedrinsky | |
|---|---|---|---|---|
| 9,589,397 | B1 * | 3/2017 | Christopher | .......... H04L 9/0863 |
| 2008/0072303 | A1 * | 3/2008 | Syed | .................... H04L 63/0838 726/10 |
| 2014/0057599 | A1 * | 2/2014 | Hazari | .............. H04W 12/0602 455/411 |
| 2016/0112260 | A1 * | 4/2016 | Pai | .......................... H04L 63/10 709/222 |

(Continued)

OTHER PUBLICATIONS

Vathalloor Merin George, "Claims-Aware Middleware for Securing IoT Services," A Thesis submitted to University of Ontario Institute of Technology, Apr. 2016, 112 pages.

(Continued)

*Primary Examiner* — Nicholas R Taylor
*Assistant Examiner* — Ho T Shiu
(74) *Attorney, Agent, or Firm* — Ryan, Mason & Lewis, LLP (57) ABSTRACT

A method includes receiving an authentication request for a remote session between a managed device and a client device, the authentication request comprising an identifier of a user of the client device and a one-time remote service credential (RSC) passcode. The method also includes providing the user identifier and the one-time RSC passcode to an identity provider and receiving, from the identity provider, a user token for the user of the client device. The method further includes authenticating the user token using a service provider, receiving a set of attributes of the user of the client device responsive to successful authentication of the user token and providing an authentication response to the managed device, the authentication response comprising the set of attributes of the user of the client device which are used to establish the remote session between the managed device and the client device.

20 Claims, 7 Drawing Sheets

(56) References Cited

U.S. PATENT DOCUMENTS

2016/0337346 A1* 11/2016 Momchilov ...... H04W 12/0023
2019/0089693 A1* 3/2019 Ding ............... H04W 12/00512

OTHER PUBLICATIONS

A. Gantait et al., "Design and Build Secure IoT Solutions, Part 1: Securing IoT Devices and Gateways, From Authentication, Including Certificate-Based Authentication, to Authorization, to Application ID Validation," IBM Corporation, May 16, 2016, 23 pages.

* cited by examiner

REMOTE SERVICE CREDENTIALS FOR ESTABLISHING REMOTE SESSIONS WITH MANAGED DEVICES

FIELD

The field relates generally to security, and more particularly to securing network communications.

BACKGROUND

Various entities may offer servicing or other support for products used by customers, including computing and storage devices. In some cases, such entities provide for remote management of products used by customers. Such products may be referred to as managed devices. Customer support personnel of a servicing entity may establish connect-in remote sessions for servicing of the managed devices. The remote sessions are typically secured by static service accounts established by the customers for servicing of managed devices by the customer support personnel of the servicing entity.

SUMMARY

Illustrative embodiments of the present invention provide techniques for securing network communications, including securing sessions for remote management of devices. Such techniques in some embodiments advantageously permit for enhanced security in remote device management.

In one embodiment, a method comprises receiving an authentication request for a remote session between a managed device at a product site of a first entity and a client device operated by a second entity external to the product site, the authentication request comprising an identifier of a user of the client device and a one-time remote service credential passcode. The method also comprises providing the user identifier and the one-time remote service credential passcode to an identity provider of the second entity, receiving, from the identity provider of the second entity, a user token for the user of the client device, and authenticating the user token using a service provider of the first entity. The method further comprises receiving a set of attributes of the user of the client device responsive to successful authentication of the user token and providing an authentication response to the managed device, the authentication response comprising the set of attributes of the user of the client device, the set of attributes of the user of the client device being used to establish the remote session between the managed device and the client device. The method is performed by at least one processing device comprising a processor coupled to a memory.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
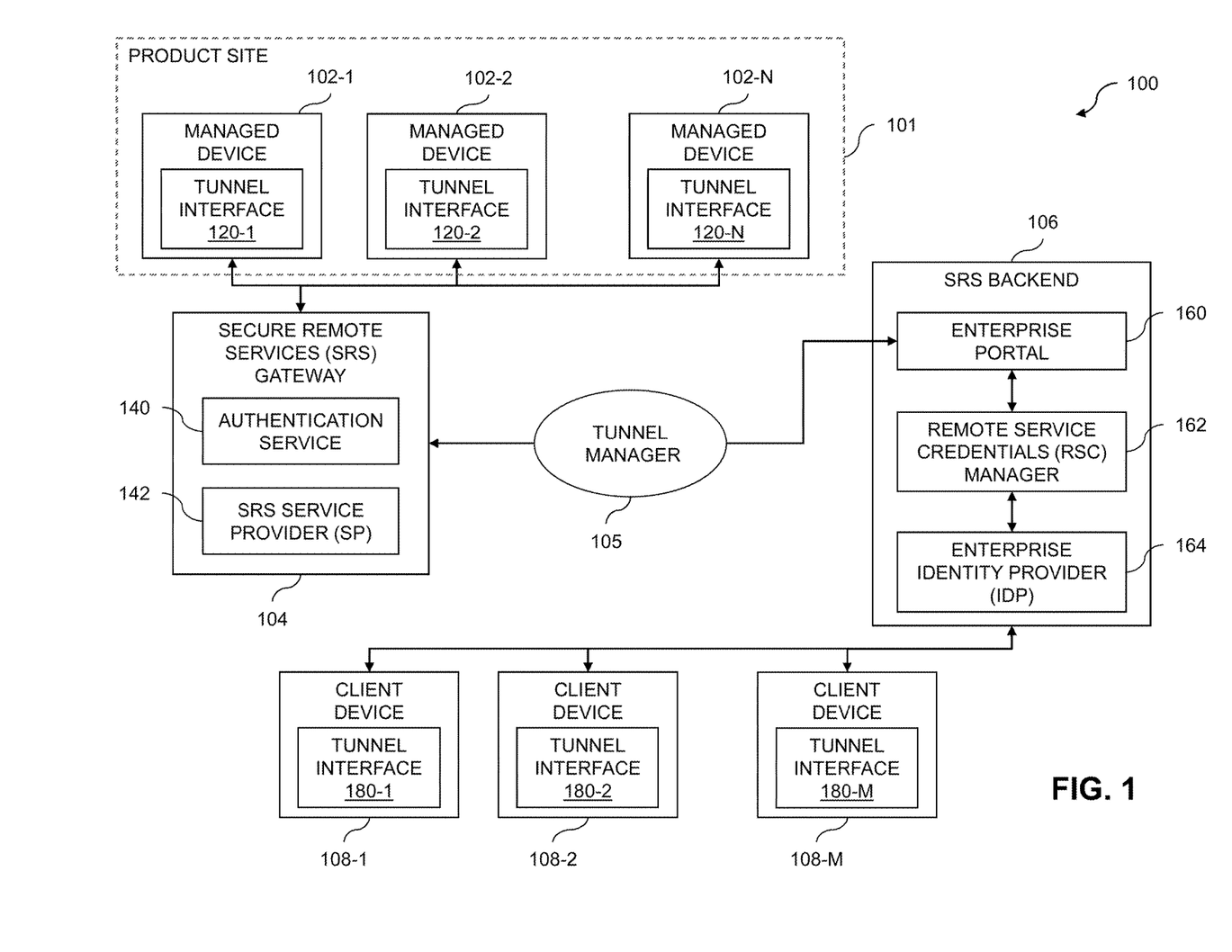
FIG. 1 is a block diagram of an information processing system providing secure network sessions for remote management of devices in an illustrative embodiment of the invention.

FIG. 1 shows an information processing system 100 configured in accordance with an illustrative embodiment. The information processing system 100 comprises a set of managed devices 102-1, 102-2, . . . , 102-N (collectively, managed devices 102) implementing respective tunnel interfaces 120-1, 120-2, . . . , 120-N (collectively, tunnel interfaces 120).

The information processing system 100 further includes a set of client devices 108-1, 108-2, . . . , 108-M (collectively, client devices 108) implementing respective tunnel interfaces 180-1, 180-2, . . . , 180-M (collectively, tunnel interfaces 180). As will be described in further detail below, the tunnel interfaces 120 of managed devices 102 and the tunnel interfaces 180 of client devices 108 are used to establish tunnels between such devices. For example, a given one of the client devices 108 (e.g., client device 108-1) may utilize its associated tunnel interface 180 to establish a secure tunnel, such as a virtual private network (VPN) tunnel, with a given one of the managed devices 102 (e.g., managed device 102-1) utilizing its associated tunnel interface 120. The secure tunnel may be established between the client device 108-1 and the managed device 102-1 to permit remote serviceability of the managed device 102-1 by a user of the client device 108-1.

The managed devices 102 are examples of products which may be deployed at one or more product sites, such as one or more data centers. In the FIG. 1 example, the managed devices 102 are part of a product site 101, assumed to be a data center associated with an entity. More particularly, the managed devices 102 may comprise respective storage systems implemented at the product site 101. The managed devices 102, however, are not limited to being storage systems. More generally, the managed devices 102 may comprise various types of deployed products, including deployed products providing at least one of compute, storage and networking functionality within one or more product sites. The managed devices 102 can comprise deployed products which include hardware, software or firmware products, as well as combinations of hardware, software and firmware products.

Product sites, as mentioned above, may be associated with different entities. In the FIG. 1 example, it is assumed that the product site 101 comprises a customer site. The managed devices 102 may comprise products deployed by a customer. The managed devices 102 may be remotely serviced or managed by an enterprise. The enterprise may be, for example, the manufacturer or provider of the deployed products, or another entity which provides servicing or other management of deployed products at product site 101 for the customer. In some embodiments, multiple different product sites are serviced by a same enterprise (e.g., a manufacturer of storage products may provide remote servicing or management functionality for products deployed by different customers at different product sites). In other embodiments, the enterprise which provides servicing of the managed devices 102 at product site 101 need not be a distinct entity from the customer that operates the managed devices 102 at product site 101. For example, a given entity may operate multiple different product sites, including product site 101. Rather than providing servicing and management of products at each individual product site, the given entity may provide a backend which services multiple different product sites. Various other arrangements of entities operating product sites and backend servicing or management support for product sites are possible.

In some embodiments, the managed devices 102 comprise Internet of Things (IoT) managed devices, such as storage systems or other storage products that are on-boarded into an IoT platform. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing one or more of the managed devices 102 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing one or more of the managed devices 102 in an illustrative embodiment.

The managed devices 102, as mentioned above, may form an enterprise IoT platform. For example, the managed devices 102 may be part of a customer environment with an enterprise providing support services for the managed devices 102. The enterprise which provides support services or other management functionality for the managed devices 102 is also referred to herein as a backend environment. In the description below, the managed devices 102 may be referred to as forming a portion of a customer environment, while the client devices 108 operated by users of the entity providing support services or other management functionality for the managed devices 102 may be referred to as forming a portion of a backend environment. The client devices 108 may be located outside of an internal network or firewall of product site 101 (e.g., the backend environment may be outside a firewall protecting the managed devices 102 in the customer environment). The client devices 108 are configured to communicate with the managed devices 102 over one or more networks, with such communications being secured over tunnels established using the tunnel interfaces 120/180.

The managed devices 102 in a customer environment of information processing system 100 are coupled to a Secure Remote Services (SRS) gateway 104, which provides an authentication service component 140 and an SRS service provider (SP) component 142. The SRS gateway 104 communicates with an SRS backend 106 in an enterprise environment of information processing system 100 via tunnel manager 105. The SRS backend 106 provides an enterprise portal component 160, a Remote Service Credentials (RSC) manager component 162 and an enterprise identity provider (IDP) component 164.

The client devices 108 may be operated by customer support representatives, engineers or other personnel of an entity which provides servicing or other management of the managed devices 102. Computing devices which may be used to implement respective ones of the client devices 108 include, for example, desktop, laptop or tablet computers, mobile telephones, or other types of processing devices capable of communicating with the managed devices 102 over a network via tunnels established utilizing tunnel interfaces 120/180.

As mentioned above, the client devices 108 are configured to communicate with the managed devices 102 over a network (not explicitly shown in FIG. 1). The network is assumed to comprise a portion of a global computer network such as the Internet, although other types of networks can be part of the network, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using IP or other related communication protocols.

The managed devices 102 and/or the client devices 108 in some embodiments may be implemented as part of cloud infrastructure in the form of a cloud-based system such as an Amazon Web Services (AWS) system. Other examples of cloud-based systems that can be used to provide at least portions of the information processing system 100 include Google Cloud Platform (GCP) and Microsoft Azure.

It is assumed that the SRS gateway 104, tunnel manager 105 and SRS backend 106 in the FIG. 1 embodiment are implemented using one or more processing platforms. One or more of the managed devices 102 and client devices 108 may also be implemented using one or more processing platforms. Such processing platforms are assumed to be implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the SRS gateway 104, tunnel manager 105 and SRS backend 106 can each be implemented in the form of one or more LXCs running on one or more VMs. Other arrangements of one or more processing devices of a processing platform can be used to implement the SRS gateway 104, tunnel manager 105 and SRS backend 106 as well as other components of the information processing system 100, such as the managed devices 102 and client devices 108.

Distributed implementations of the information processing system 100 are possible, in which certain components of the system reside in one data center in a first geographic location while other components of the system 100 reside in one or more other data centers in one or more other geographic locations that are potentially remote from the first geographic location. Thus, it is possible in some implementations for different portions of the information processing system 100, such as different portions of the SRS gateway 104, tunnel manager 105 and SRS backend 106, to reside in different data centers. Numerous other distributed implementations of the information processing system 100 are possible.

It is to be appreciated that these and other features of illustrative embodiments are presented by way of example only, and should not be construed as limiting in any way.

Accordingly, different numbers, types and arrangements of system components such as managed devices 102, SRS gateway 104, tunnel manager 105, SRS backend 106 and client devices 108 can be used in other embodiments.

It should be understood that the particular sets of devices, modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
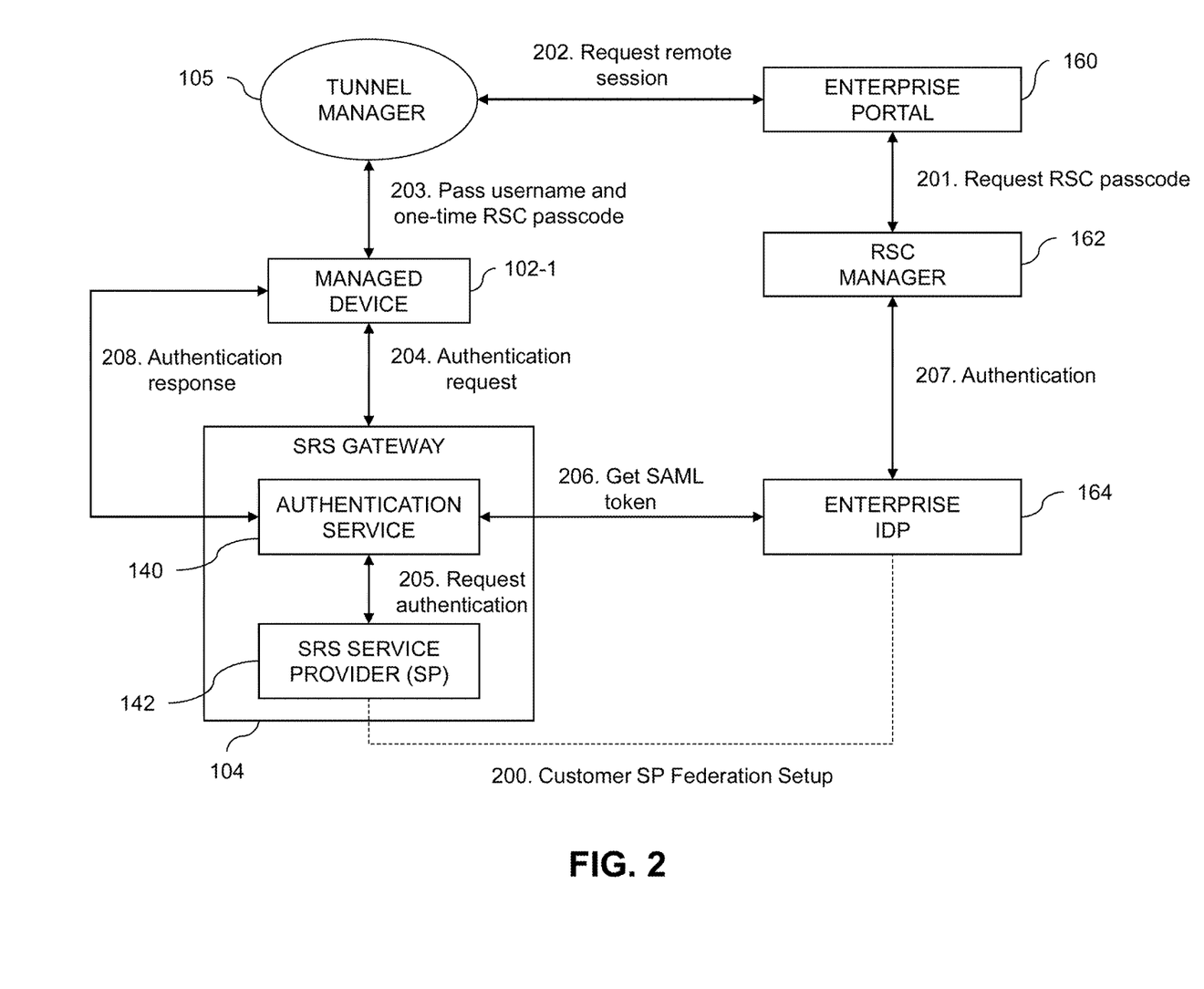
FIG. 2 is a block diagram showing a processing flow for providing secure network sessions for remote management of devices in the information processing system of FIG. 1 in an illustrative embodiment.

The operation of the information processing system 100 will now be described in further detail with reference to the processing flow of FIG. 2. The process as shown includes steps 200 through 208. In the FIG. 2 embodiment, it is assumed that in a step 200, performed prior to initiation of step 201, the SRS SP 142 and the enterprise IDP 164 have federated with one another, so as to establish a set of user attributes for different users of the entity which provides remote servicing or other management of managed devices 102. The set of user attributes may include different sets of user attributes or permissions for different classes of users, or different sets of users attributes for individual ones of the users of the entity providing remote servicing or other management of managed devices 102, or combinations thereof. The set of user attributes may also differ based on the managed devices 102. For example, a user may have a first set of attributes for servicing or management of a first one of the managed devices 102 but a different second set of attributes for servicing or management of a second one of the managed devices 102.

In some cases, such as due to regulatory requirements, security concerns, etc., a customer running the managed devices 102 at product site 101 may wish to limit the permissions or other access to one or more of the managed devices 102 by client devices 108 providing remote servicing or management. Such limitations on permissions or access may be based on various different factors including, by way of example: (i) geographic location (e.g., the customer may wish to limit remote servicing or management to client devices that are located in a same country or other designated region where the managed devices 102 are located, or to restrict access by client devices 108 located in one or more designated geographic regions); (ii) a type of computing device used to implement the client devices 108 (e.g., the customer may wish to ensure that only client devices 108 which utilize secure hardware not subject to certain known or potential vulnerabilities are able to establish remote sessions with managed devices 102); (iii) a time of servicing or other establishment of a remote session (e.g., the customer may wish to ensure that operation of the managed devices 102 is not disrupted during certain time periods). It is to be appreciated that these factors are presented by way of example only, and that various other factors including combinations of these and other factors may be used.

The process begins with step 201, where a given one of the client devices 108 (e.g., client device 108-1) requests a one-time RSC passcode from the RSC manager component 162 via the enterprise portal component 160. Step 201 may involve the client device 108-1 providing a cookie to the RSC manager 162 via enterprise portal 160, with the cookie including information such as a username or other identifier of a user of the client device 108-1, an identifier of the client device 108-1, an identifier of the managed device 102-1 with which the client device 108-1 seeks to establish a secure remote session, a virtual environment identifier (e.g., an identifier of the SRS gateway 104 associated with product site 101), etc. The RSC manager 162 can utilize the information provided in the cookie to generate a one-time RSC passcode, which is then provided back to the client device 108-1 via the enterprise portal 160.

The client device 108-1 then sends a request for a remote session to a given one of the managed devices 102 (e.g., managed device 102-1) via the tunnel manager 105. The client device 108-1 and managed device 102-1 use their respective tunnel interfaces 180-1 and 120-1 to set up the remote session tunnel. The remote session request may include the username or other identifier of the user of the client device 108-1, along with the one-time RSC passcode obtained by the client device 108-1 from the RSC manager 162 in step 201. In step 203, such information is passed to the managed device 102-1 via the tunnel manager 105.

The managed device 102-1 then issues an authentication request to the authentication service component 140 of SRS gateway 104 in step 204. The authentication request includes the username or other user identifier of the user of the client device 108-1 and the one-time RSC passcode. In some embodiments, the authentication request sent to the authentication service component 140 from managed device 102-1 is signed using a certificate associated with the managed device 102-1.

The authentication service component 140 then forwards the request for authentication to the SRS SP 142 in step 205. In some embodiments, this causes the SRS SP 142 to send a redirect back to the authentication service component 140, such as using a reverse Simple Object Access Protocol (SOAP) redirect, which binds the one-time RSC passcode to the remote session request transmitted in step 202. This binding, for example, may bind the one-time RSC passcode to one of or both of the user identifier of the user of the client device 108-1 and an identifier of the managed device 102-1.

On receiving the redirect from the SRS SP 142, the authentication service component 140 in step 206 obtains a security assertion markup language (SAML) token from the enterprise IDP 164. In some embodiments, step 206 includes sending the username or other user identifier of the user of the client device 108-1 and the one-time RSC passcode to the enterprise IDP 164. The enterprise IDP 164 in step 207 provides such information to the RSC manager 162. The RSC manager 162 validates the one-time RSC passcode, confirming that is was issued to the user of the client device 108-1 for the particular remote session request, and provides a set of user attributes for the user of the client device 108-1. This set of user attributes are those which the enterprise providing remote servicing or other management of managed devices 102 associates with the user of the client device 108-1. Put another way, the set of user attributes provided by the RSC manager 162 to the enterprise IDP 164 are those that are attested to or otherwise claimed by the entity providing servicing or other management of managed devices 102. The enterprise IDP 164 uses the received set of attributes to generate the SAML token, which is provided back to the authentication service component 140.

The authentication service component 140 then passes the SAML token, or the user attributes claimed in the SAML token, in a request for authentication to the SRS SP 142. The SRS SP 142 validates the user attributes claimed in the SAML token against those agreed upon by the customer during the federation setup in step 200. The SRS SP 142 then sends back a set of attributes to the authentication service component 140. It is important to note that, in some cases, the set of attributes sent from the SRS SP 142 to the authentication service component 140 may not exactly match that of the set of attributes in the SAML token provided from the enterprise IDP 164 to the authentication service component 140. For example, the entity providing servicing or other management of managed device 102-1 may indicate that the user of the client device 108-1 requesting the remote session has more privileges or permissions than the customer agrees to. Thus, the set of attributes passed from the SRS SP 142 to the authentication service component 140 may be different than those in the SAML token provided to the authentication service component 140 by the enterprise IDP 164.

In step 208, the authentication service component 140 provides an authentication response to the managed device 102-1. The authentication response, in some embodiments, includes the set of user attributes provided to the authentication service component 140 by the SRS SP provider 142. In some cases, that set of user attributes may be in the form of a SAML token (which may be the same as or different from the SAML token provided to the authentication service component 140 from the enterprise IDP 164 as described above). The authentication response sent to the managed device 102-1 may be signed using a certificate associated with the SRS backend 106, such as a certificate associated with RSC manager 162, providing assurance to the managed device 102-1 of the attributes included in the authentication response.

Figure 3A:
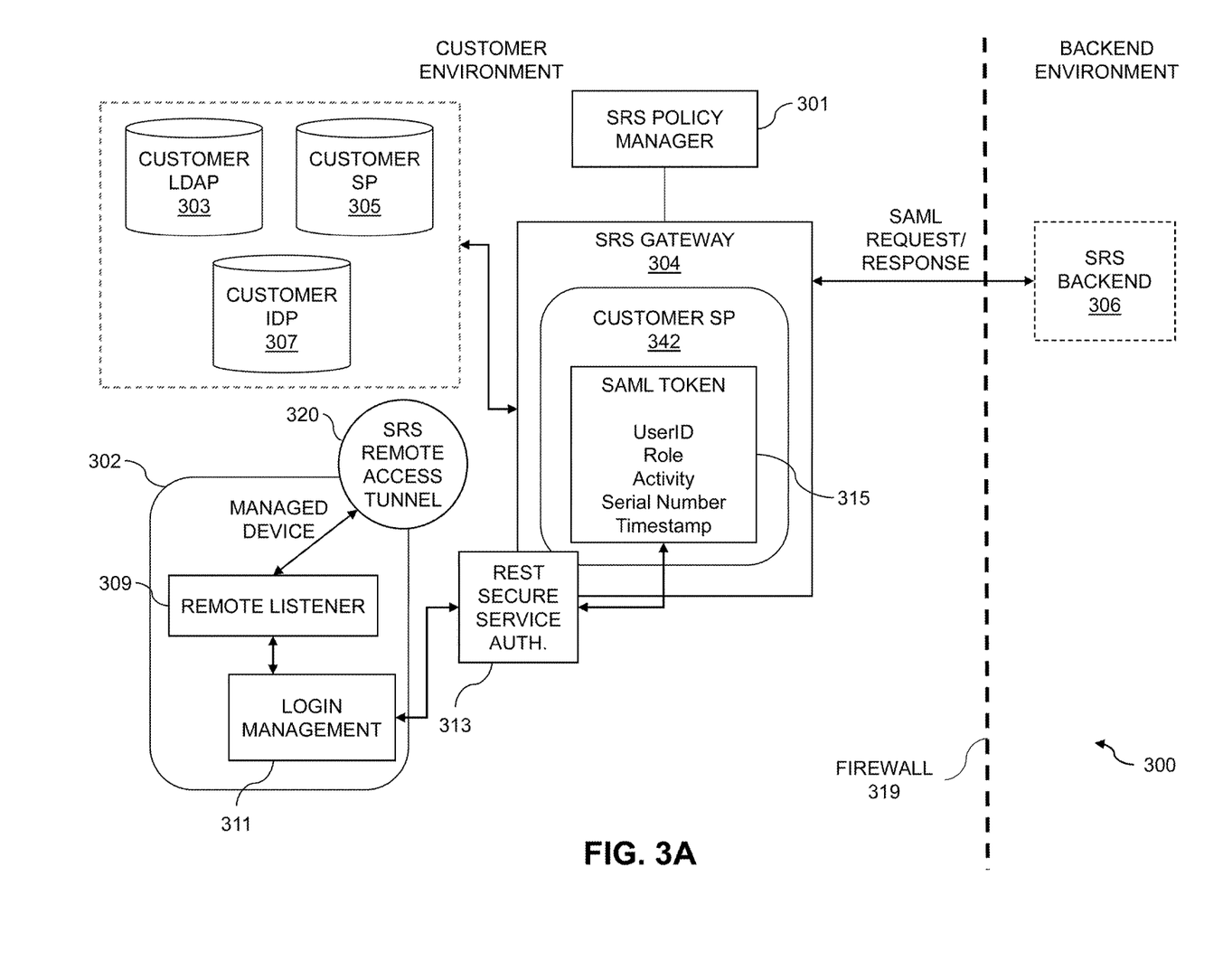
FIGS. 3A and 3B show a block diagram of another information processing system providing secure network sessions for remote management of devices in an illustrative embodiment.
Figure 3B:
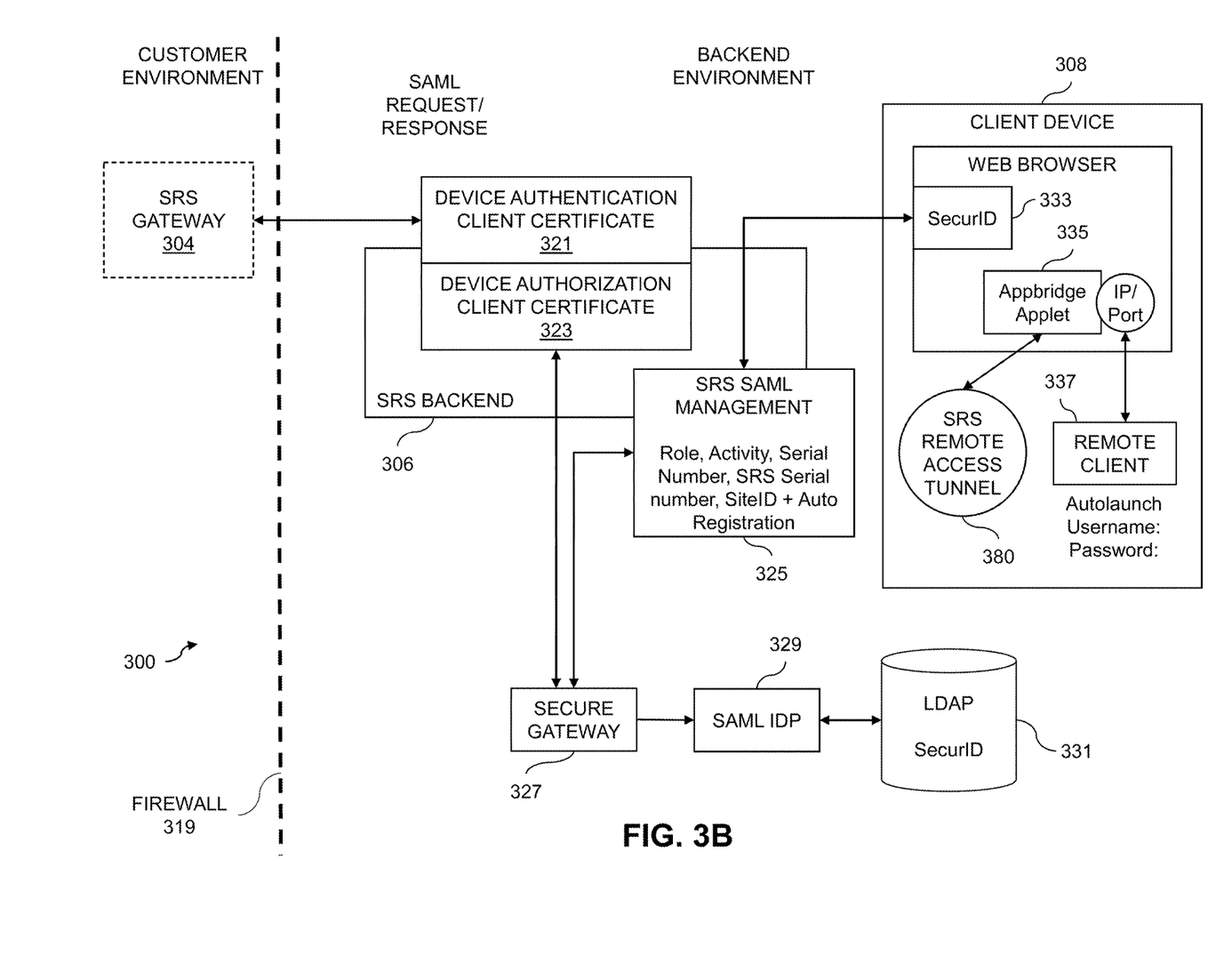

FIGS. 3A and 3B show an information processing system 300, illustrating a customer environment (e.g., a product site) and a backend environment (e.g., of an enterprise IoT platform or other platform of an entity providing servicing or management of managed devices in the customer environment). Like reference numerals in FIGS. 3A and 3B are used to denote elements similar to elements in the information processing system 100.

The customer environment includes a managed device 302 and an SRS gateway 304. The SRS gateway 304 is coupled to an SRS policy manager 301, which may store policies used to govern or control various aspects for securing remote sessions between the managed device 302 in the customer environment and a client device 308 in the backend environment. The SRS policy manager 301 may be implemented as an application configured to enable a customer to grant or restrict access to managed devices based on unique guidelines and requirements. The SRS policy manager 301 may be further configured to manage a detailed audit log of actions taken as part of management of the managed devices.

The SRS gateway 304 is also coupled to a number of databases, such as a customer Lightweight Directory Access Protocol (LDAP) database 303 storing information for maintaining distributed directory information for the customer environment (e.g., for managing external access for third party vendors), a customer SP database 305 storing information for the SP of the customer environment (e.g., for federated authentication and authorization), and a customer IDP database 307 (e.g., for authentication and authorization of third party vendors).

The managed device 302 implements remote listener 309 and login management components 311. The remote listener component 309 is configured to listen for remote session requests for establishing an SRS remote access tunnel 320 with client device 308 in the backend environment. The SRS remote access tunnel 320 is an example of a tunnel which may be established using a tunnel interface. The login management component 311 is configured to communicate with the SRS gateway 304 utilizing one or more representational state transfer (REST) secure service authentication application programming interfaces (APIs) 313. The SRS gateway 304 provides a customer SP 342, which manages a SAML token 315 that is received from SRS backend 306 in the backend environment in response to a SAML request issued by the SRS gateway 304.

The customer environment is connected to the backend environment via a firewall 319. The firewall 319 may be friendly to or otherwise allow access or transfer of information over SRS remote access tunnels between managed device 302 in the customer environment and the client device 308 in the backend environment.

The backend environment includes the SRS backend 306 and client device 308. The SRS backend 306 manages a device authentication client certificate 321 and a device authorization client certificate 323 for signing SAML requests and responses exchanged between the SRS backend 306 and SRS gateway 304 as well as other entities in the information processing system 300. In some embodiments, the device authentication client certificate 321 is an X509 digital certificate of a managed device (e.g., managed device 302) used to authenticate the managed device 302 to the SRS backend 306 or more generally to the backend environment. The device authorization client certificate 323 is an authenticated version of the device authentication client certificate 321, used for authorization.

The SRS backend 306 further includes a SRS SAML management component 325, which manages assertions for SAML tokens including but not limited to assertions such as role, activity, serial number, SRS serial number, site identifier (SiteID) and auto registration, etc. The SRS SAML management component 325 is configured to implement a backend SAML management system that attaches information and roles of a user that is attempting a connection to the managed device 302 for management thereof. The SRS SAML management component 325 is further configured to attach asset details for the managed device 302, which can be used by the customer for access control.

The SRS backend 306 and the SRS SAML management component 325 are coupled to a secure gateway component 327, a SAML IDP 329 and a LDAP database 331 for the backend environment, which may maintain SecurID® credentials. The secure gateway component 327 implements a secure API gateway system, the SAML IDP 329 provides a vendor SAML identity provider for user federation, and the LDAP 331 provides LDAP for the vendor used for access control.

The client device 308 comprises a web browser with a SecurID® authentication component 333, and an Appbridge applet 335. The Appbridge applet 335 in some embodiments is configured as a Java applet of the web browser, which launches the SRS remote access tunnel 380 or more generally the secure tunnel for connection to the managed device 302. The Appbridge applet 335 utilizes SecurID® or other suitable credentials and user validations in launching the SRS remote access tunnel 380. The client device 308 may be configured with auto-launch capability utilizing remote client 337, providing a username and password for a user of the client device 308 to the Appbridge applet 335, possibly along with IP address and port information. The Appbridge applet 335 of the client device 308 communicates with the managed device 302 over SRS remote access tunnel 380. The remote client 337 in some embodiments is configured as a secure client application that does not have physical access to the client device 308.

In some embodiments, RSC are introduced for IoT connectivity solutions involving customer service remote access, serviceability or other management. RSC provide a number of useful features, including providing one-time passcode functionality or use for remote service session requests in an IoT enterprise platform.

Managed devices, such as managed devices 102, may be configured with an ability to opt-in to use of one-time RSC features. This allows the managed devices 102 (or the SRS SP 142 of SRS gateway 104), for example, to select characteristics of the one-time RSC passcodes used to secure remote session requests. Such characteristics include length, complexity, duration of validity, etc.

In addition to permitting managed devices or SRS SP 142 to select characteristics of one-time RSC passcodes, some embodiments permit the managed devices 102 or SRS SP 142 to opt-in to the use of one-time RSC features altogether. Managed devices 102 can utilize RSC REST APIs to enroll and de-enroll in the use of one-time RSC passcodes for remote session requests as desired. Managed devices 102 can also be configured to block the use of static or fixed credentials for login attempts via remote sessions, requiring the use of one-time RSC passcodes providing enhanced security. Managed devices 102 or SRS SP 142 may further be configured to define access controls for remote sessions responsive to one-time RSC passcode validation. Such access controls may be in the form of designated types of user access by client devices 108, such as super user, service user, basic user, other defined privilege levels for user groups, roles, etc. Different types of user access or roles may be associated with an ability to use different lists of commands or other features for controlling aspects of the managed devices 102. Managed devices 102 or SRS SP 142 are configured to make decisions regarding allowing requests for access in some embodiments based on SAML attributes of a SAML token, so as to grant an intended level of access to managed devices 102 on successful validation or authentication of one-time RSC passcodes.

Managed devices 102 may be further configured to utilize RSC REST APIs, such as authentication and secure service REST APIs, for providing one-time passcode validation over secure channels (e.g., tunnels established between the managed devices 102 and client devices 108). The above-described features support secure solutions for remote servicing or other management of managed devices 102, with such secure solutions leveraging SRS channels or tunnels between managed devices 102 in a customer environment and client devices 108 in a backend environment such as an IoT enterprise platform. Remote applications on managed devices 102 can be customized or configured to utilize the RSC REST APIs, independent of programming language.

The RSC REST APIs may be used to provide various serviceability automation features, including by way of example, enabling remote support with RSC capabilities, providing mutual Secure Sockets Layer (SSL) handshake capabilities from managed devices to the SRS gateway during RSC passcode validation flows, and enabling customer service provider federation. The RSC REST APIs can be implemented using various high-level languages (e.g., Java, C#, C, C++, Object C, etc.) and scripts (e.g., JavaScript, Perl, Python, Curl, Flex, etc.).

In some embodiments, the RSC REST APIs may be accessed using web browsers or programming platforms that are configured to issue hypertext transfer protocol (HTTP) requests. In some embodiments, RSC REST APIs are configured for use with web browsers having Transport Layer Security (TLS) security settings enabled. The RSC REST APIs may comprise a set of uniform resource identifiers (URIs) used to consume different RESTful services.

To enroll and de-enroll in the use of RSC features, an enableRSC REST API may be used. The enableRSC REST API may be invoked by a managed device to enable (or disable) RSC features on the managed device. The enableRSC REST API may utilize an HTTP POST method, with request headers that indicate various authorization and other information such as a model, serial number, hashed message authentication code (HMAC), domain information, date and time information, etc. The request body may include multipart form data, such as information regarding a passcode length and other attributes of one-time RSC passcodes which the managed device wants to use. The response code for a successful invocation of the enableRSC REST API may comprise an HTTP 200 OK response, with the response headers including an archive file (e.g., a ZIP file) that contains certificates. The response body in some embodiments includes the signed client certificate used for client authentication as well as a signed RSC root certificate that may be used to verify the signature on user attributes.

The HTTP 200 OK response is used in response to a successful invocation of the enableRSC REST API. Various other HTTP response types may be used in other cases, such as a 402 Unauthorized response indicating that user authentication failed (e.g., that a device key is invalid, device certificate validation failed, incorrect serial number and model parameters, etc.), 400 Bad Request response indicating that a bad request was supplied, 404 Not Found response indicating that a resource was not found, a 415 Unsupported Media Type response indicating that content type is missing, a 500 Internal Server Error response indicating an error at the SRS backend, and a 503 Service Unavailable response indicating that one or more services of the SRS gateway or SRS backend are down or otherwise unavailable.

An enableRSCPasscodeValidation REST API may be invoked by a managed device to enable a one-time RSC passcode validation flow. The enableRSCPasscodeValidation REST API may be invoked by the managed device during a remote or secure session to authenticate a username and one-time RSC passcode, and to retrieve user attributes for a user requesting access to the managed device. The enableRSCPasscodeValidation REST API may utilize an HTTP Get method, with request headers similar to those used by the enableRSC REST API and with a request body that includes information such as the username, the one-time RSC passcode, client certificates for accessing APIs, etc. as input parameters. The response code for a successful invocation of the enableRSCPasscodeValidation REST API, similar to the enableRSC REST API, may comprise an HTTP 200 OK response, with response headers including application and JavaScript Object Notation (JSON) content type indicators and with a response body that includes the user attributes in the JSON format. It is to be appreciated, however, that the JSON format is not a requirement, but merely an example of a format which may be used for providing user attributes in the response.

Managed devices 102, which may be storage products deployed at a product site 101 as discussed above, may be on-boarded into an IoT platform that is operated by an enterprise which provides servicing or other management of the managed devices 102. A drawback of conventional IoT platforms, however, is in the use of static service accounts (e.g., which use static or fixed credentials for authentication) for connect-in or remote sessions for management of managed devices. Such drawbacks include various security constraints that may be in place for sharing of service credentials, limits on the range of access control options, etc. If service account information is not available to a client device seeking to provide servicing of one of the managed devices 102, a customer call or WebEx session may be required.

Moreover, significant effort may be expended in managing service accounts which utilize static or fixed credentials, which is exacerbated for support organizations or entities with multiple geographic locations, with multiple partners or customers at different managed locations or product sites, for customer environments or product sites with large numbers of managed devices, for assigning different permissions to different users or classes of users, etc. Another drawback relates to transparency, as a customer or SP operating managed devices typically has limited or no role or visibility into the credential validation infrastructure used by the entity providing servicing or other management of the customer's managed devices.

The use of one-time RSC passcodes in an IoT enterprise platform provides an ability to bind the one-time passcode mechanisms securely into existing and future remote session tunnel managers. Customer service engineers or other users of client devices 108 providing servicing or other management of managed devices 102 can utilize generated tokens (e.g., SAML tokens) as passwords or other credentials for remote applications on the managed devices 102. Further, one-time passcode functionality can be plugged in or supported by auto-launch capabilities on client devices 108, such as the use of remote client 337 for auto-launch in the Appbridge applet 335 of client device 308.

In some embodiments, use of RSC provides advantages in making auditing information available, both for managed devices 102 and the entity providing servicing or other management of the managed devices 102 (e.g., both in the customer and backend environments). Details regarding the users of remote sessions, length of connections of remote sessions, activities during remote sessions, asset details for managed devices, and other audit information is made available, such as by association with use of a particular one-time RSC passcode. For the customer, such auditing information provides for more transparency leading to higher confidence in the security of remote sessions. For the support or management entity, the auditing information may be utilized to refine processes for servicing and management of the managed devices 102, to determine which actions or patterns of activity are useful or lead to beneficial results, etc.

Some embodiments integrate SAML tokens with IDP for machine to machine traffic and user authentication and authorization. Assertions in SAML tokens may include, for example, user name, user identifier (ID), group ID, email ID, phone number, title, and other information. The RSC REST API with client certificate enforcement is provided for mutual SSL handshakes. SAML is used as a mechanism for exchanging credentials between managed devices 102 (or SRS gateway 104) and the SRS backend 106. A Shibboleth framework is used to understand SAML messages in the managed devices 102, SRS gateway 104 and SRS backend 106. Integration with a tunnel manager such as a tunnel manager 105 allows for securely binding one-time passcodes with particular client devices 108 or users thereof, with particular managed devices 102, with particular remote sessions, etc.

In some embodiments, a token generator service is secured using RSA SecurID® authentication enabling multi-factor authentication. A service or support engineer can login to the enterprise portal 160 using an RSA SecurID® token, with user authorization checks in business processes, and obtain one-time RSC passcodes for connecting to managed devices 102 as governed by customer specifications. The one-time RSC passcodes are bound to an SRS tunnel based off the RSA SecurID® authorization. This is illustrated in the information processing system 300 by the use of SecurID component 333.

Authenticity of user attributes is verified using digital client certificates configured and obtained as part of initial RSC enablement of RSC features. A mutual SSL handshake between the managed device and the SRS gateway is enabled during user authentication and authorization. The mutual SSL handshake provides certificate-based authentication for both the connection between the managed devices 102 and the SRS gateway 104, and between the SRS gateway 104 and the SRS backend 106. Client and web-based remote applications (e.g., CLIViaSSH, WebUI, etc.) can take advantage of the use of RSC credentials with minimal changes on existing authentication modules. Embodiments also keep options open for customer SP federation integration.

Figure 4:
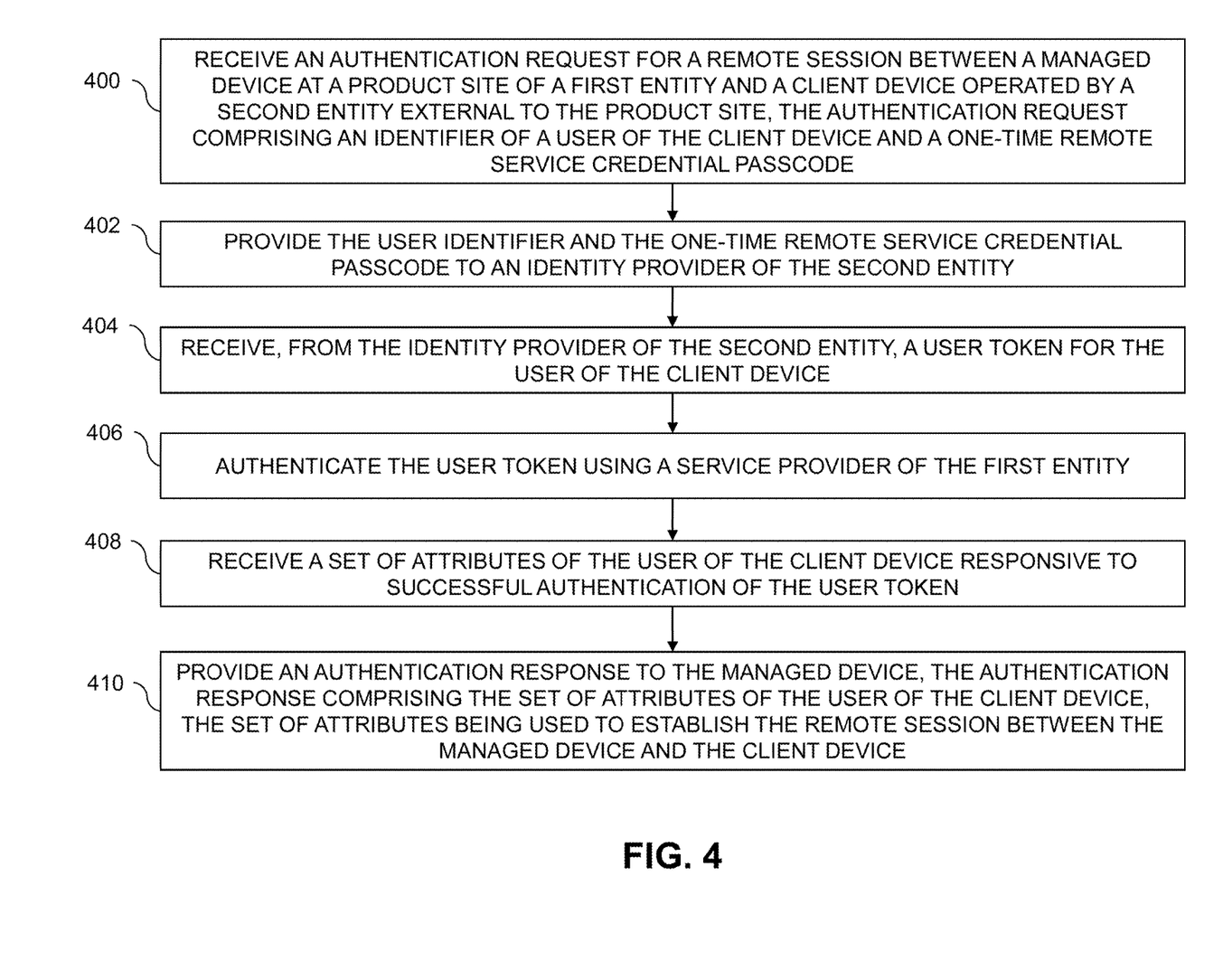
FIG. 4 is a flow diagram of an exemplary process for providing secure network sessions for remote management of devices in an illustrative embodiment.

FIG. 4 is a flow diagram illustrating an exemplary processing flow for securing network sessions for remote management of devices. The FIG. 4 processing flow is suitable for use in information processing systems 100 and 300, but is more generally applicable to other types of information processing systems comprising one or more managed devices. The process is more particularly assumed to be implemented in at least one processing platform configured to communicate over one or more networks with at least one product site and a plurality of managed devices corresponding to products deployed at the product site.

In step 400, an authentication request is received (e.g., at SRS gateway 104) for a remote session between a managed device (e.g., one of managed devices 102 or managed device 302) at a product site 101 of a first entity and a client device (e.g., one of client devices 108 or client device 308) operated by a second entity external to the product site 101. The managed device may comprise an IoT managed device on-boarded to an IoT remote servicing platform of the second entity. The authentication request comprises an identifier of a user of the client device, and a one-time RSC passcode. The authentication request received in step 400 may be received over or utilizing a REST API. The user identifier and the one-time RSC passcode may be received at the managed device utilizing the REST API over a remote session tunnel that is established between the managed device and the client device. The one-time RSC passcode may be bound to at least one of the user identifier of the user of the client device and an identifier of the managed device. This binding may be performed by utilizing a reverse SOAP binding.

The managed device may be configured to enroll in the use of one-time RSC passcodes utilizing the REST API. Responsive to such enrollment, the managed device may be configured to block additional authentication requests for remote sessions when such additional authentication requests utilize a static password or other static or fixed credentials.

In step 402, the user identifier and the one-time RSC passcode contained in or received in conjunction or in association with the authentication request received in step 400 are provided to an identity provider of the second entity, such as enterprise IDP 164 in SRS backend 106. In step 404, a user token for the user of the client device requesting the remote session is received from the identity provider of the second entity. The user token may comprise a SAML token that is created for the remote session and is used to identify user attributes of the user of the client device that are agreed upon between a service provider of the first entity (e.g., SRS SP 142) and the identity provider of the second entity. Such user attributes may include the user identifier for the user of the client device and at least one of a role of the user of the client device, an activity of the user of the client device for servicing of the managed device, a serial number of the client device or managed device, a timestamp indicating a creation time of the SAML token, etc.

The service provider of the first entity may be federated with the identity provider of the second entity to agree on the set of attributes of the user of the client device requesting the remote session. During such federation, or when the managed device enrolls for use of one-time RSC passcodes for securing remote sessions, the managed device or service provider of the first entity may specify one or more properties of the one-time RSC passcodes. Such properties may include a length of the one-time RSC passcode, a complexity of the one-time RSC passcode, and a duration of validity for generated one-time RSC passcodes.

In step 406, the user token received in step 404 is authenticated by the service provider of the first entity. A set of attributes of the user of the client device is received in step 408 responsive to successful authentication of the user token. An authentication response is provided to the managed device in step 410. The authentication response may comprise the set of attributes of the user of the client device, possibly in the form of a user token such as a SAML token. Such attributes are used to establish the remote session between the managed device and the client device. The user token or user attributes may be utilized by the user of the client device as credentials in one or more remote applications running on the managed device. In some embodiments, the authentication request received in step 400 is signed using a certificate of the managed device, while the authentication response provided to the managed device in step 410 is signed using a certificate associated with the second entity (e.g., a certificate of the SRS backend 106 such as a certificate of the RSC manager 162, etc.).

It is to be appreciated that the FIG. 4 process and other functionality described above can be adapted for use with other types of information systems comprising one or more processing platforms.

The particular processing operations and other system functionality described in conjunction with the flow diagram of FIG. 4 are therefore presented by way of illustrative example only, and should not be construed as limiting the scope of the disclosure in any way. Alternative embodiments can use other types of processing operations involving securing sessions for remote management of devices. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another, in order to implement a plurality of different securing sessions for different managed devices of a given information processing system.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Embodiments provide a number of advantages relative to conventional techniques. For example, embodiments enable integration of next generation security concepts and defense mechanisms into remote sessions for servicing or other management of managed devices 102 launched over an enterprise IoT platform, as well as security compliance benefits. Improved access control and security audit features permit customers to gain confidence in the security of managed devices 102. In addition, the customer can be part of the authentication process by integrating customer SP federation into authentication of remote sessions.

Some embodiments provide an ability to audit transaction information (e.g., commands executed by a support engineer using a client device in a remote session with a managed device data collected while performing a service request for a managed device, etc.) Embodiments may further reduce support organization cost for managing service accounts. Advantages are also provided in the ease of product (e.g., managed device) integration with RSC REST service plug-ins. Embodiments also reduce the need for continuous customer-side software updates by managing solution and logic at the enterprise side in the backend environment.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the managed device 102 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of information processing systems in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
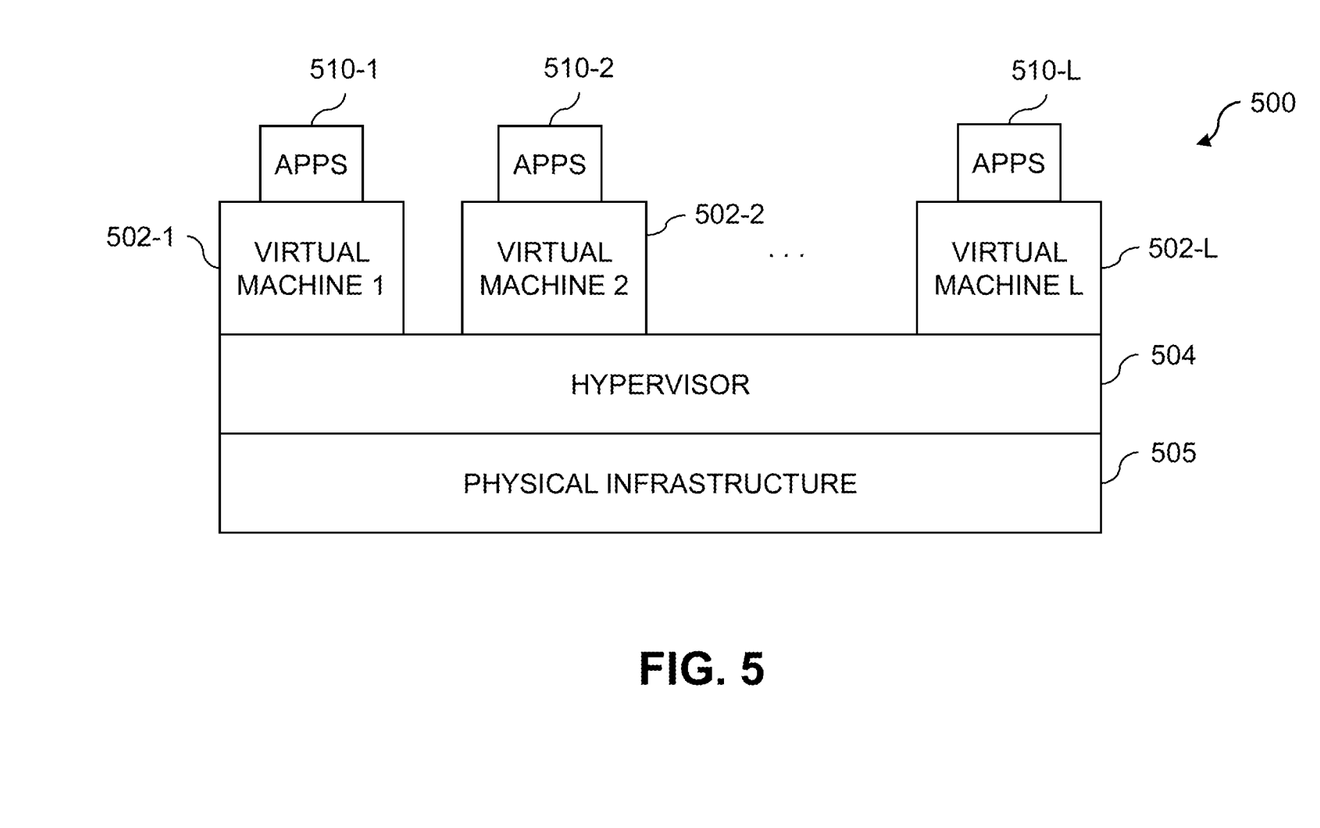
FIGS. 5 and 6 show examples of processing platforms that may be utilized to implement at least a portion of an information processing system in illustrative embodiments.
Figure 6:
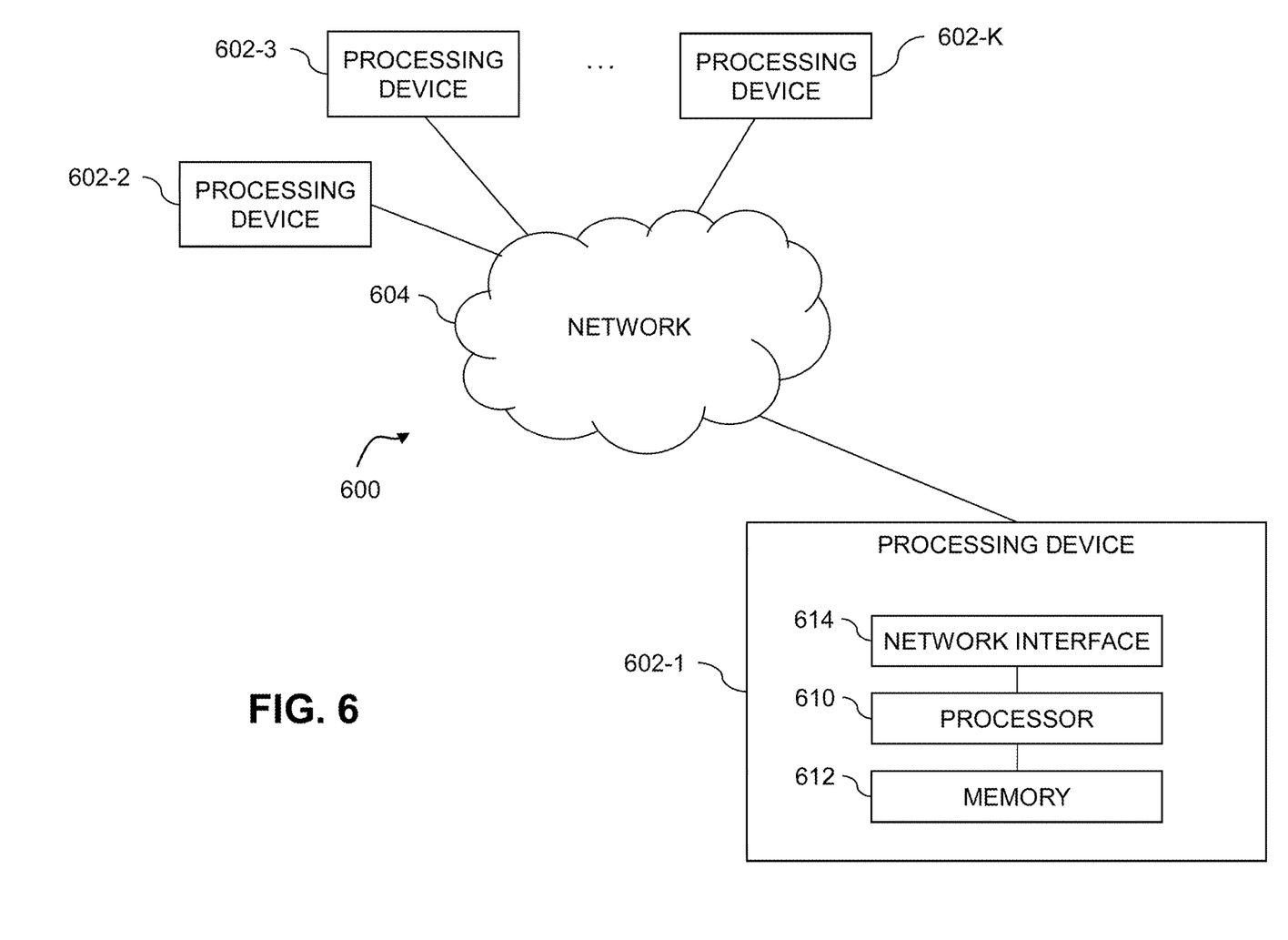

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises virtual machines (VMs) 502-1, 502-2, ..., 502-L implemented using a hypervisor 504. The hypervisor 504 runs on physical infrastructure 505. The cloud infrastructure 500 further comprises sets of applications 510-1, 510-2, ..., 510-L running on respective ones of the virtual machines 502-1, 502-2, ..., 502-L under the control of the hypervisor 504.

Although only a single hypervisor 504 is shown in the embodiment of FIG. 5, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 504 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ..., 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the information processing system 100 are illustratively implemented in the form of software running on one or more processing devices.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, service providers, identity providers, tunnels, user attributes, etc. can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   receiving an enrollment request to enable remote servicing for a managed device at a product site of a first entity, the enrollment request specifying one or more properties of one or more remote service credential passcodes to be utilized for accessing the managed device at the product site of the first entity;
   receiving an authentication request for a remote session between the managed device at the product site of the first entity and a client device operated by a second entity external to the product site, the authentication request comprising a user identifier of a user of the client device and a given one of the one or more remote service credential passcodes, the given remote service credential passcode having the one or more properties specified in the enrollment request;
   providing the user identifier and the given remote service credential passcode to an identity provider of the second entity;
   receiving, from the identity provider of the second entity, a user token for the user of the client device;
   authenticating the user token using a service provider of the first entity;
   receiving a set of attributes of the user of the client device responsive to successful authentication of the user token; and
   providing an authentication response to the managed device, the authentication response comprising the set of attributes of the user of the client device, the set of attributes of the user of the client device being used to establish the remote session between the managed device and the client device;
   wherein the authentication request for the remote session comprises a request by the client device operated by the second entity for performing remote servicing of the managed device at the product site of the first entity;
   wherein providing the given remote service credential passcode to the identity provider of the second entity comprises binding the given remote service credential passcode to the request by the client device operated by the second entity for performing remote servicing of the managed device at the product site of the first entity; and
   wherein the method is performed by at least one processing device comprising a processor coupled to a memory.

2. The method of claim 1 wherein binding the given remote service credential passcode to the request by the client device operated by the second entity for performing remote servicing of the managed device at the product site of the first entity comprises binding the given remote service credential passcode to the user identifier and an identifier of the managed device.

3. The method of claim 2 wherein binding the given remote service credential passcode to the user identifier and the identifier of the managed device comprises utilizing a reverse simple object access protocol (SOAP) binding.

4. The method of claim 1 further comprising federating the service provider of the first entity with the identity provider of the second entity to agree on the set of attributes of the user of the client device.

5. The method of claim 1 wherein the user token comprises a security assertion markup language (SAML) token.

6. The method of claim 5 wherein the SAML token is created for the remote session to identify user attributes for the user of the client device agreed upon between the service provider of the first entity and the identity provider of the second entity.

7. The method of claim 6 wherein the user attributes comprise the user identifier and at least one of: a role of the user of the client device; an activity of the user of the client device for servicing of the managed device; a serial number; and a timestamp indicating a creation time of the SAML token.

8. The method of claim 1 wherein the one or more properties of the one or more remote service credential passcodes specified in the enrollment request comprise at least one of: a length of the one or more remote service credential passcodes; a complexity of the one or more remote service credential passcodes; and a duration of validity of the one or more remote service credential passcodes.

9. The method of claim 1 wherein the authentication request is received from the managed device over a Representational State Transfer (REST) application programming interface (API).

10. The method of claim 9 wherein the user identifier and the given remote service credential passcode are received at the managed device from the client device utilizing the REST API over a remote session tunnel established between the managed device and the client device.

11. The method of claim 10 further comprising blocking at least one additional authentication request received at the managed device, the additional authentication request comprising a login attempt by the user of the client device over the remote session tunnel that utilizes a static password.

12. The method of claim 1 wherein the user token is utilized as credentials for the user of the client device in one or more remote applications running on the managed device.

13. The method of claim 1 wherein the authentication request is signed using a certificate of the managed device, and wherein the authentication response is signed using a certificate of the second entity.

14. The method of claim 1 wherein the managed device comprises an Internet of Things (IoT) managed device that is on-boarded to an IoT remote servicing platform of the second entity.

15. A computer program product comprising a non-transitory processor-readable storage medium having stored therein program code of one or more software programs, wherein the program code when executed by at least one processing device cause the at least one processing device:
to receive an enrollment request to enable remote servicing for a managed device at a product site of a first entity, the enrollment request specifying one or more properties of one or more remote service credential passcodes to be utilized for accessing the managed device at the product site of the first entity;
to receive an authentication request for a remote session between the managed device at the product site of the first entity and a client device operated by a second entity external to the product site, the authentication request comprising a user identifier of a user of the client device and a given one of the one or more remote service credential passcodes, the given remote service credential passcode having the one or more properties specified in the enrollment request;
to provide the user identifier and the given remote service credential passcode to an identity provider of the second entity;
to receive, from the identity provider of the second entity, a user token for the user of the client device;
to authenticate the user token using a service provider of the first entity;
to receive a set of attributes of the user of the client device responsive to successful authentication of the user token; and
to provide an authentication response to the managed device, the authentication response comprising the set of attributes of the user of the client device, the set of attributes of the user of the client device being used to establish the remote session between the managed device and the client device;
wherein the authentication request for the remote session comprises a request by the client device operated by the second entity for performing remote servicing of the managed device at the product site of the first entity; and
wherein providing the given remote service credential passcode to the identity provider of the second entity comprises binding the given remote service credential passcode to the request by the client device operated by the second entity for performing remote servicing of the managed device at the product site of the first entity.

16. The computer program product of claim 15 wherein the user token comprises a security assertion markup language (SAML) token, and wherein the SAML token is created for the remote session to identify user attributes for the user of the client device agreed upon between the service provider of the first entity and the identity provider of the second entity.

17. The computer program product of claim 15 wherein the managed device comprises an Internet of Things (IoT) managed device that is on-boarded to an IoT remote servicing platform of the second entity.

18. An apparatus comprising:
at least one processing device comprising a processor coupled to a memory;
the at least one processing device being configured:
to receive an enrollment request to enable remote servicing for a managed device at a product site of a first entity, the enrollment request specifying one or more properties of one or more remote service credential passcodes to be utilized for accessing the managed device at the product site of the first entity;
to receive an authentication request for a remote session between the managed device at the product site of the first entity and a client device operated by a second entity external to the product site, the authentication request comprising a user identifier of a user of the client device and a given one of the one or more remote service credential passcodes, the given remote service credential passcode having the one or more properties specified in the enrollment request;
to provide the user identifier and the given remote service credential passcode to an identity provider of the second entity;
to receive, from the identity provider of the second entity, a user token for the user of the client device;
to authenticate the user token using a service provider of the first entity;
to receive a set of attributes of the user of the client device responsive to successful authentication of the user token; and
to provide an authentication response to the managed device, the authentication response comprising the set of attributes of the user of the client device, the set of attributes of the user of the client device being used to establish the remote session between the managed device and the client device;
wherein the authentication request for the remote session comprises a request by the client device operated by the second entity for performing remote servicing of the managed device at the product site of the first entity; and wherein providing the given remote service credential passcode to the identity provider of the second entity comprises binding the given remote service credential passcode to the request by the client device operated by the second entity for performing remote servicing of the managed device at the product site of the first entity.

19. The apparatus of claim 18 wherein the user token comprises a security assertion markup language (SAML) token, and wherein the SAML token is created for the remote session to identify user attributes for the user of the client device agreed upon between the service provider of the first entity and the identity provider of the second entity.

20. The apparatus of claim 18 wherein the managed device comprises an Internet of Things (IoT) managed device that is on-boarded to an IoT remote servicing platform of the second entity.

* * * * *